United States Patent [19]

Benedetti et al.

[11] 4,444,444
[45] Apr. 24, 1984

[54] EQUIPMENT FOR STORAGE OF ENERGY UNDER KINETIC FORM AND RECOVERY THEREOF IN ELECTRIC FORM AND METHOD OF USING SUCH EQUIPMENT

[75] Inventors: Alain Benedetti, Meulan; Luc Laury, Orsay; Francis Legrand, Rocquencourt; Pierre Poubeau, Le Pecq; Bernard Weisser, Verneuil-sur-Seine, all of France

[73] Assignee: Societe Nationale Industrielle Aerospatiale, Paris, France

[21] Appl. No.: 313,041

[22] Filed: Oct. 19, 1981

[30] Foreign Application Priority Data

Aug. 17, 1981 [FR] France ................................ 81 15831

[51] Int. Cl.³ .............................................. F16C 39/06
[52] U.S. Cl. ..................................................... 308/10
[58] Field of Search .................. 308/10; 244/165, 166; 74/5.46; 310/74, 153, 113

[56] References Cited

U.S. PATENT DOCUMENTS

| 3,490,816 | 1/1970 | Lyman | 308/10 |
| 3,845,995 | 11/1974 | Wehde | 74/5.46 |
| 3,955,858 | 5/1976 | Poubeau | 244/166 |
| 4,077,678 | 3/1978 | Studer | 308/10 |
| 4,114,960 | 9/1978 | Habermann | 308/10 |
| 4,211,452 | 7/1980 | Poubeau | 74/5.46 |

FOREIGN PATENT DOCUMENTS

| 2114040 | 10/1971 | Fed. Rep. of Germany | 308/10 |
| 2500211 | 7/1975 | Fed. Rep. of Germany | 308/10 |
| 1475945 | 2/1967 | France | 308/10 |
| 2413578 | 7/1979 | France | 308/10 |
| 2451595 | 10/1980 | France | 308/10 |
| 1268429 | 3/1972 | United Kingdom | 308/10 |
| 2002929 | 2/1979 | United Kingdom | 308/10 |

Primary Examiner—R. Skudy
Attorney, Agent, or Firm—Karl W. Flocks; A. Fred Starobin; Sheridan Neimark

[57] ABSTRACT

An uninterruptible electric power source comprising a rotor and a stator with the stator having a magnetically suspended flywheel with magnet rings for radial centering, a double electromagnet in a servoloop for restoring equilibrium including a rate sensor and lift-off logic in the servoloop encased in an evacuated vacuum enclosure. Variation in the structure of elements including the enclosure are described.

31 Claims, 16 Drawing Figures

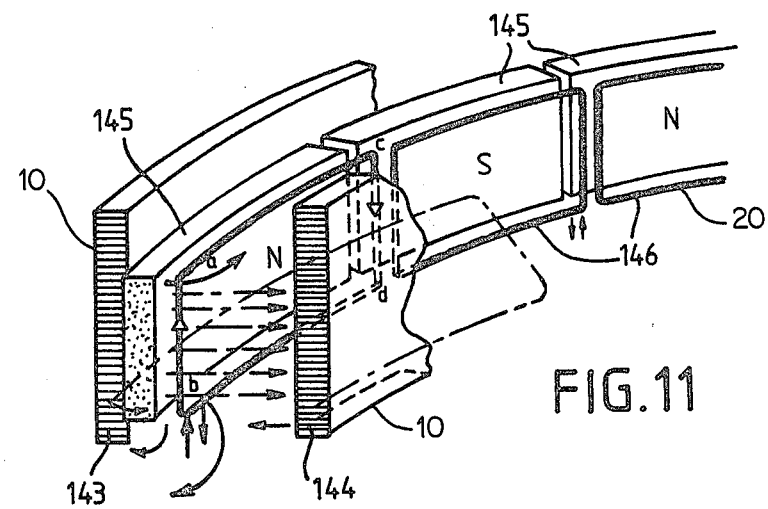
FIG.11
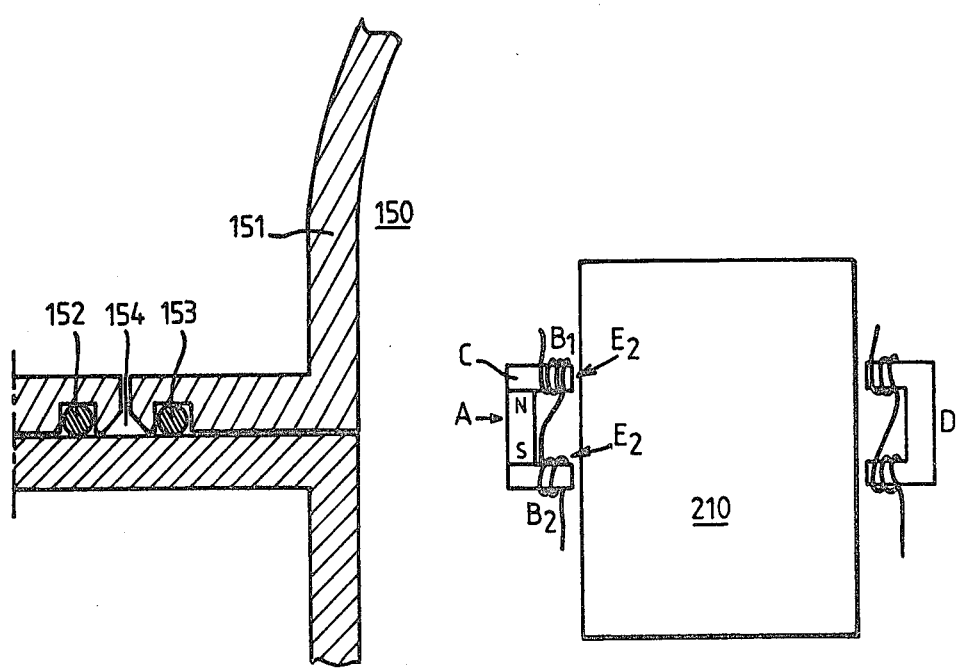
FIG.12
FIG.15

EQUIPMENT FOR STORAGE OF ENERGY UNDER KINETIC FORM AND RECOVERY THEREOF IN ELECTRIC FORM AND METHOD OF USING SUCH EQUIPMENT

BACKGROUND OF THE INVENTION

This invention relates generally to the obtaining of an uninterrupted electric power source and particularly involves the use of flywheels to obtain the source of power.

Configurations of inertial flywheels magnetically suspended are particularly described in U.S. Pat. No. 3,955,858 issued on May 11, 1976 and U.S. Pat. No. 4,211,452 issued on July 8, 1980.

These patents relate to flywheels which may be used for satellite attitude control and/or satellite energy storage, and of course, for any application of the flywheel compatible with its shape and basic concept.

SUMMARY OF THE INVENTION

The present invention relates to a specific concept oriented towards ground application of the magnetically suspended flywheels, having some of the characteristic features of the systems described in the prior patents as well as new features related to the ground applications of these flywheels.

One of the objects of the equipment according to this invention is the capacity of storing useful energy in a range of up to at least 1 kilowatt-hour which may be increased by increasing the weight and dimensions of the equipment with an input and output power of 6 kw which can also be increased according to the present invention in the same way as the energy can be increased.

The present invention relates to an equipment for storage of energy and more particularly a magnetically suspended flywheel rotor which accumulates energy under kinetic form when it is driven into rotation by an electric motor and which delivers such energy in electric form through an electrical generator involving the deceleration of the rotor, the equipment comprising a rotor part and a stator part.

The operation of the equipment involves generally but not necessarily maintaining the rotor in a vacuum environment and for this purpose the housing which supports the stator and the rotor can be a sealed vacuum enclosure.

Additionally, the motor, the generator and the magnetic suspension are operated in association to electric circuits which are generally located outside the vacuum enclosure, but can also be introduced therein.

Basically, the present invention comprises a flywheel rotor as the uninterrupted power source storing energy under kinetic form, the energy being introduced and taken out in electric form, the rotor being magnetically supported by passive radial centering magnetic rings associated to an axial actuator separated from the radial magnetic centering and constituted by a double biased electromagnet, the axial actuator being controlled by a servoloop operated from an axial speed sensor with a lift-off logic and without any position sensor. The magnetic suspension needs touch-down bearings on which the rotor rests when the active circuits of the magnetic suspension are not in operation. This subsystem is constituted by ball bearings with appropriate surfaces of contact enabling the rotor to enter into contact with the stator through the ball bearing system.

BRIEF DESCRIPTION OF THE DRAWINGS

The advantages of the present invention will appear more clearly from the following description of particular embodiments which is made in reference to the attached drawings, in which:

FIG. 11 shows a motor associated with the operation of the rotor similar to a generator also included in the present equipment;

FIG. 12 illustrates a portion of a form of construction for a vacuum enclosure that may be used for containing the object of this application;

FIG. 15 is a schematical view showing the radial damping devices of this full rotor.

DESCRIPTION OF THE PREFERRED EMBODIMENTS

Figure 1:
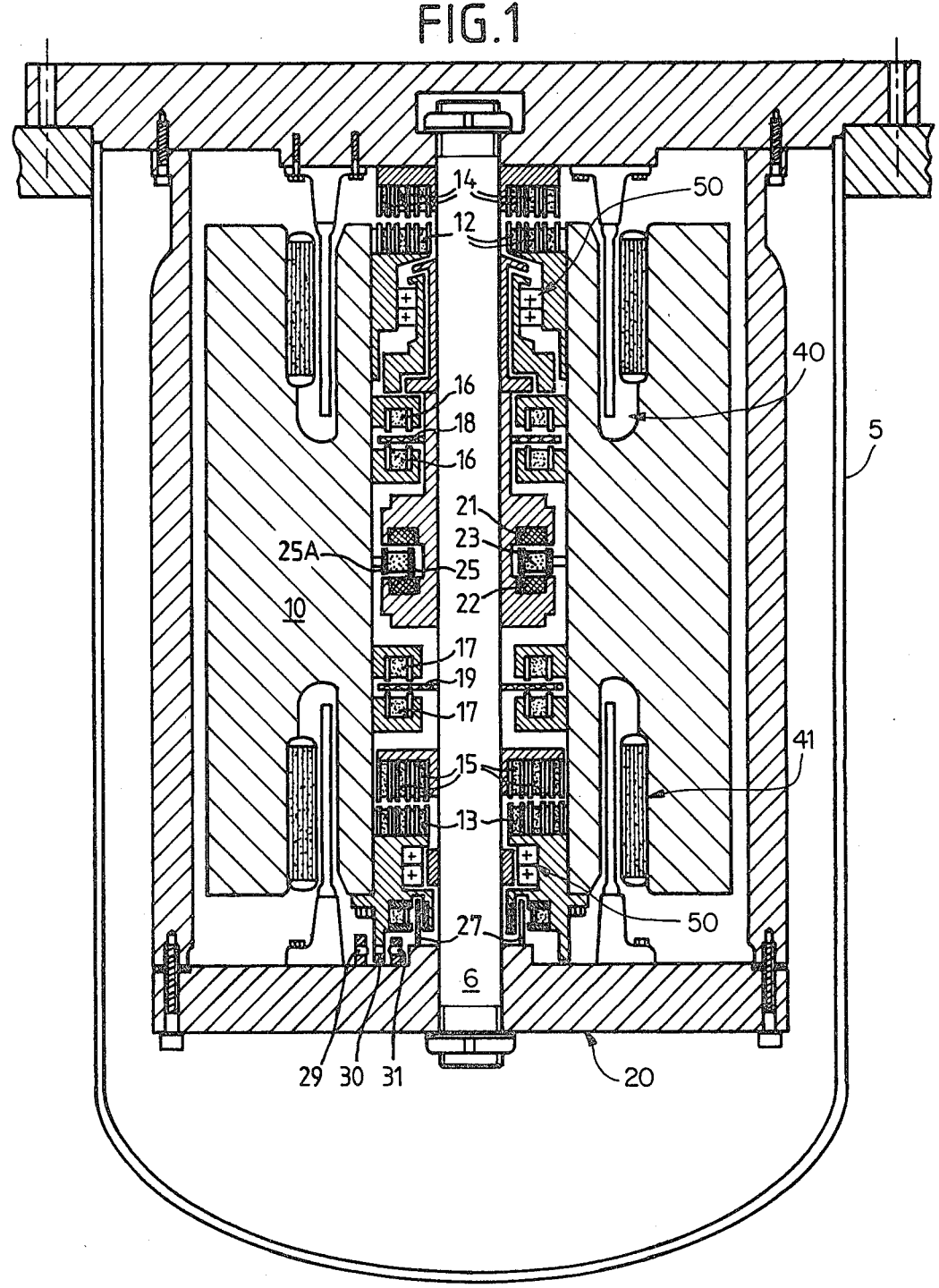
FIG. 1 schematically represents an overall view of the system of the present invention with details shown enlarged in the following figures.

As shown in the overall view of FIG. 1, the flywheel rotor 10 which is the element storing the energy comprises a steel cylinder which is bored in its center to leave a passage therethrough for a fixed shaft 6 which is part of a stator 20. Said rotor can be supported in two different ways:

in normal operation, it is magnetically supported by a magnetic suspension and there is no mechanical contact between the rotating parts of the equipment and the non-rotating parts thereof;

when the system is not in operation or when the magnetic suspension is not activated for any reason, the rotor comes into contact with touch-down bearings 50 which are constituted by ball bearings.

The following elements are attached to the steel rotor:

the rotating elements of the magnetic suspension,
the magnetic circuits of the motor and the generator and the commutation ring of the motor, and
the rotating part of the touch-down bearings.

The following elements are attached to the stator:
the stationary elements of the magnetic suspension,
the ironless coils of the motor and the generator,
the non-rotating part of the touch-down bearings the sensor which produce the signals for the electronic commutation of the motor, complementary sensors for temperatures and pressure monitoring, if necessary, and the plugs providing the input and the output of electric power and of monitoring signals.

The vacuum enclosure is generally hermetically sealed by welding (for example, electron beam welding, tin welding . . . ). It can also be provided with a system allowing it to be opened while avoiding any gas input and with a getter system absorbing residual gases, the degasing of the materials and the vapors delivered by the materials included in the vacuum enclosure.

The form of embodiment of the present invention such as represented in FIG. 1 shows the power source enclosed in a vacuum enclosure 5 which is provided for installation below the floor or ground surface for obtaining additional safety. In this form of embodiment the element 10 is a steel rotor to which magnetic centering rings 12 and 13 are fixed. Other magnetic rings 14 and 15 are fixed to the shaft 6 of the stator respectively facing those magnetic centering rings of the rotor. These rings for centering the rotor with respect to the stator together perform two functions (see FIGS. 3 and 4):

they provide a radial restoring force when the magnetic axis of the rotor centering rings is offset as compared to the magnetic axis of the stator rings and they provide an axial force which can be made equal to the weight of the rotor to maintain an appropriate gap between rotor and stator rings, as the shaft is vertical.

The radial centering is completed by a radial damping system comprising rotor elements 16 and 17 and stator elements 18 and 19.

Permanent retention of the appropriate gap is performed through a servoloop creating forces controlled in the axial direction.

The position in which the attraction of the magnetic rings is equal to the force of gravity upon the mass of the rotor is an equilibrium position which by itself is unstable. The system needs a servoloop to return the rotor to its equilibrium position when it moves off therefrom.

Figure 2:
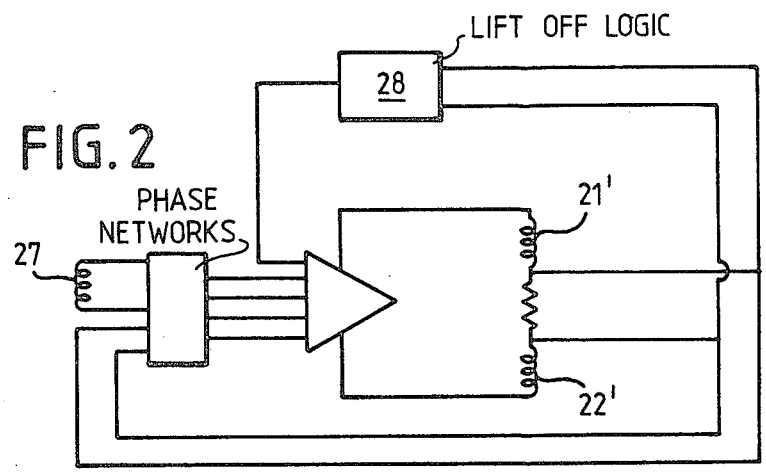
FIG. 2 shows a schematic diagram of an electric servoloop with the lift-off logic.

The necessary forces are produced by a double electromagnet 21,22 fixed to the central stationary shaft 6. The magnetic circuit of this double electromagnet is biased by a permanent magnetic ring 23 in a mobile armature 25,25A fixed to the rotor. Due to the magnetic biasing circuit as illustrated in FIG. 2, the same current flows in both of the actuator coils 21 and 22 and according to the direction of the current, the force on the mobile armature 25,25A is in one or the other direction. The amplitude of the current is controlled from the signal of coils of a sensor 27 measuring the speed of the axial rotor motion, in addition to a feedback signal proportional to the current itself, each signal being adapted in gain and phase as is usual in any servoloop system.

For the initial abutment lift-off operation, when the rotor is resting on the touch-down bearings 50, a lift-off logic 28 which is located or the station enters in action. Its operation is the following: the servoloop of FIG. 2 is not stable without the presence of the axial rate signal; consequently, the current increases spontaneously in one direction in the double electromagnet immediately after the axial servoloop is switched on, the rotor being initially resting on the touch-down bearing.

If the current direction is the correct one, when the current reaches a sufficient level, the resulting force created by the double electromagnet takes the rotor out of its resting position, overcoming the forces resulting from the combination of the axial stiffness of the magnetic centering ring and the force of gravity applied to the mass of the rotor.

From the moment there is an axial motion of the rotor, the axial speed signal is present and the servoloop takes the rotor into the equilibrium position in which the weight of the rotor is compensated for by the attraction of the magnetic centering rings. There is no more flow of current in the double electromagnet than is necessary for compensating the external perturbations like small motions of the ground and the noise voltage at the input of the electronic amplifiers. The value of this current is negligible in mean value.

If the current flowing in the double electromagnet is initially in the wrong direction, the current tends to create a force which pushes the rotor more strongly against the touch-down bearing preventing motion in the axial direction. The current increases to a level which is above the normal one that produces lift-off when it is in the right direction. The circuits of the lift-off logic detect this situation and produce reversed current in the double electromagnet. Then, the situation becomes the same as in the first case in which the current was initially in the correct direction.

A variant of this lift-off logic can also be used; it operates in the following manner: when the current increases in the double electromagnet, the rate of increase is well defined so that instead of detecting the level of current which should have produced the lift off operation from a certain value, and for reversing the direction of current, it is possible to let the current increase during a certain time and if there is no lift-off, after this amount of time, the lift-off logic reverses the direction of the current and the overall operation remains the same.

Figures 3, 4:
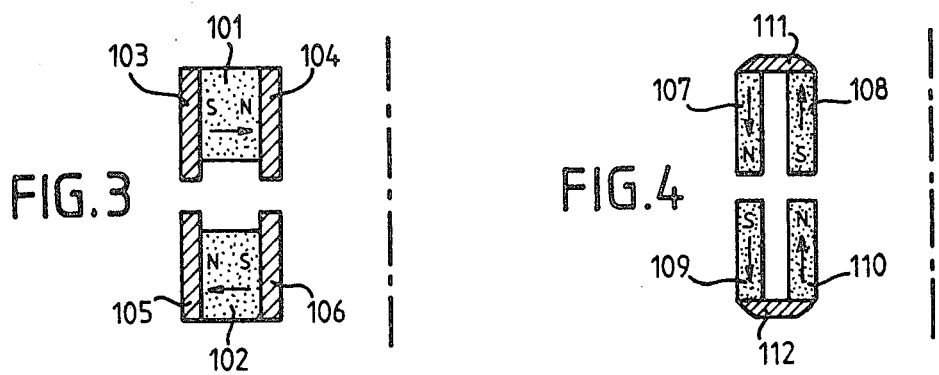
FIG. 3 shows a basic configuration for the radial centering rings.
FIG. 4 shows an alternative configuration for the radial centering rings of FIG. 3.

The basic configuration for the radial centering rings appears in FIG. 3. The rings both on the rotor and the stator are similar to one another. The magnetic field is produced by rings of permanent magnets 101,102 and it is conducted by iron or magnetic steel crowns 103 and 104 of a low resistivity on opposite sides of ring 101 associated to the stator and by steel crowns of high resistivity (cobalt iron, amorphous iron, etc . . . ) 105 and 106 on the sides of ring 102 opposite to the rotor to the gap in which it is concentrated.

Another configuration is presented in FIG. 4. The flux comes out directly from the magnet rings 107,108,109,110 which are magnetized in the same direction as the axis of the rotor. The pieces 111,112 close the magnetic flux at the ends of the magnetic rings opposite to the gap.

Figures 5, 6:
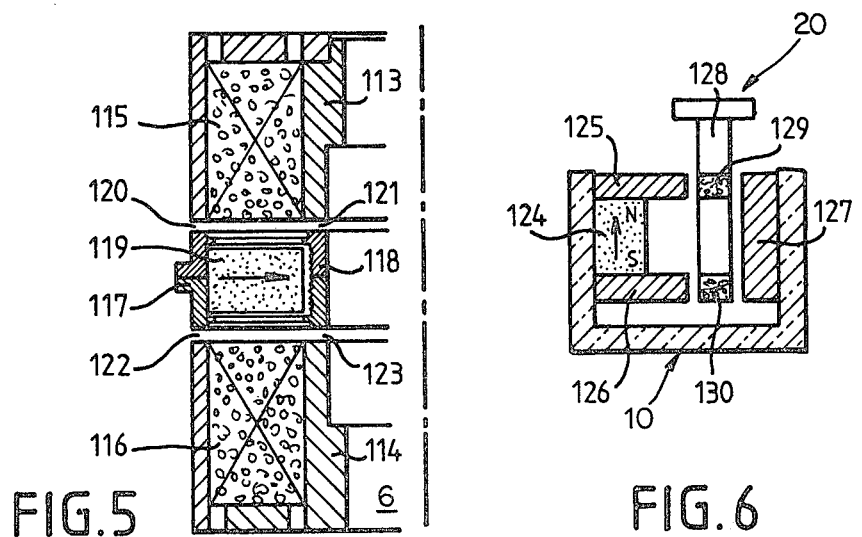
FIG. 5 is a view of the axial actuator of the equipment according to the invention.
FIG. 6 shows the axial speed sensor according to the present invention.

The double electromagnet called also an axial actuator as shown in FIG. 5 comprises two cylindric armatures 113,114 in which a copper wire is wound at 115,116. Armatures 113,114 with their copper windings are attached to the central stationary shaft. The polar pieces 117,118 are fixed to the rotor. A permanent magnet ring 119 is placed between them and is radially magnetized. The magnetic flux of the magnet ring comes out of the N pole of the annular magnets and is divided into two parts. One portion of the flux enters the upper armature 113 and the other portion the lower armature 114. When the gaps are equal both fluxes are equal. Let us assume that coils 115 and 116 are connected in the appropriate way. When the current flows in both coils the magnetic flux, for example, increases in gaps 120, 121 and decreases in the other two gaps 122,123. In this way the force created between the polar pieces 117,118 of the movable armature and the armature 113 is higher than the force created between the same movable elements and the fixed armature 114. The resulting force is utilized for the rotor lift-off operation and for making stable the naturally unstable equilibrium position of the rotor in respect to the stator.

The axial speed sensor 27 schematized in FIG. 1 is shown in detail in FIG. 6. According to this form of embodiment, a magnetic circuit is attached to the rotor part and when an axial motion of the rotor occurs this magnetic circuit induces an electromotive force in a double coil which is attached to the stator part.

The magnetic circuit is composed of the magnet ring 124 axially magnetized, the polar pieces 125,126 and armature 127 which closes the magnetic flux on the other side of the gaps. Inside the gaps a cylindrical support 128 is provided with two coils 129, 130. The axial motion of the magnetic circuits produces an electromotive force in both coils which are connected in such a way that the electromotive forces are added.

The axial servoloop being in operation, the rotor is supported without any mechanical contact with the stator by the magnetic forces of the centering rings, and possibly with an additional force resulting from the magnetic flux due to the permanent magnet in the axial actuator, if the gaps 120,121 are not equal to gaps 122,123 for producing the equilibrium position. The rotor being centered radially by the magnetic actions between the centering rings, the damping associated with these restoring forces might be insufficient. The existing damping is due to the eddy currents and hysteresis losses occurring due to the magnetic field variations when there is a radial motion of the rotor towards the stator. Consequently, according to the operational rotating speed range of the equipment it can be useful to introduce an additional damping to avoid radial excitation of the rotor, possibly produced by the disturbing forces occurring in the whole of the speed range, particularly when crossing the different critical frequencies.

Figure 7:
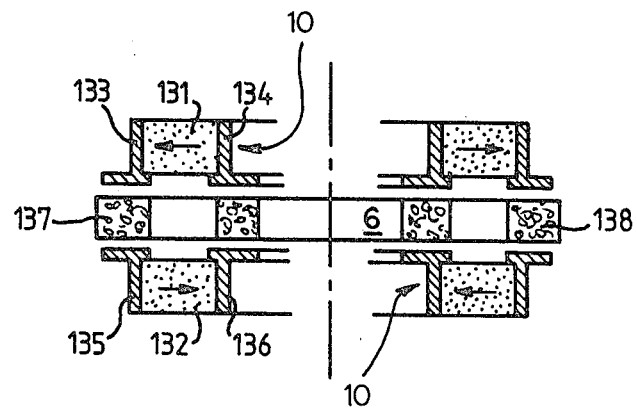
FIGS. 7 and 8 illustrate the damping subsystem used in the equipment of the present invention.
Figure 8:
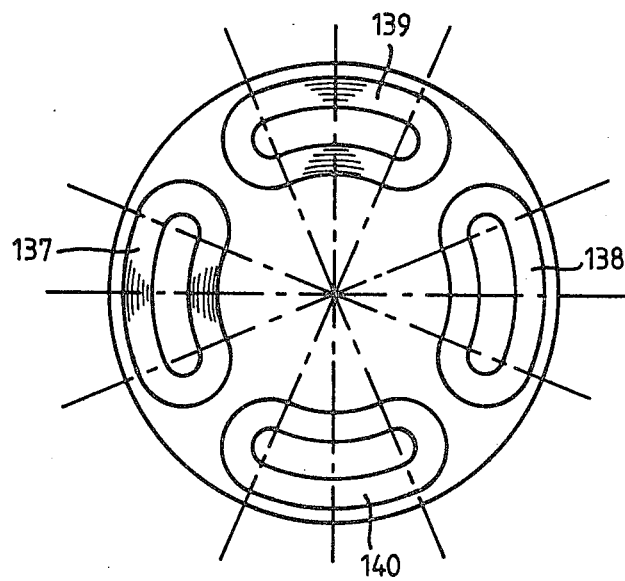
Figure 9:
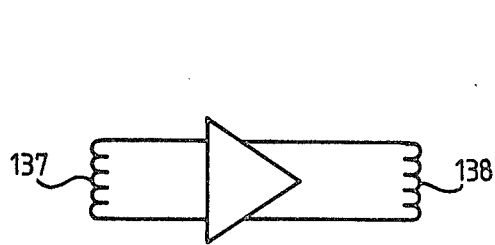
FIG. 9 shows amplification of electromotive forces in the damping subsystem of FIGS. 7 and 8.

In the damping subsystem shown in FIGS. 7 and 8, there are shown two annular permanent magnets 131,132 which are fixed to the rotor part with their polar pieces 133,134,135,136. The permanent magnets are radially polarized. They send a magnetic flux through the gap in which four coils 137,138,139,140 are placed. When the rotor rotates around the axis of the centering rings which are coaxial with the parts of the damping sybsystem, the coils are not submitted to any magnetic field variations and therefore no electromotive force is induced therein. When a radial oscillation is superposed to the rotation, then an electromotive force is induced into the coils. If the coils are short-circuited there is an induced current which produces a damping effect. As shown in FIG. 9, such effect can be amplified by using the electromotive force induced in the coil 137 as an input signal for an amplifier.

Figure 10:
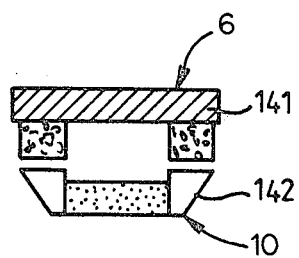
FIG. 10 shows a variant of the magnetic damping system.

When the amplifier has not to be used, the coils may be replaced by a simple copper plate. Thus, according to an alternative form of embodiment shown in FIG. 10, a part 141 of the magnetic circuit is fixed with the coils or the copper plate to the stator. The other part 142 of the magnetic circuit is fixed to the rotor. In such a case the magnetic circuit of the damping system contributes to the passive radial centering and/or the weight supporting.

It is also obvious that in the case in which a damping amplifier must be used, input signals for the upper and lower damping means can be obtained from any sensor permitting the detection of the radial speed of the rotor during its oscillation. In this case, the current can be sent in all the coils such as 137, 138, 139, 140. Motion sensors can particularly be used and the derivative of this parameter with respect to the time can then be taken out.

Generally, the damping can already be optimized by increasing the energy spent on the stator part during the radial deviation motions of the rotor. The ferro-magnetic crowns of the stator are advantageously realized from a material of a low electric resistivity such as pure iron, possibly embedded in a non-magnetic good conductor material such as copper or aluminum. The equivalent crowns on the rotor are to the contrary made of ferro-magnetic material having high resistivity and laminated (iron cobalt alloys, amorphous iron, etc.); they will be embedded or fixed in an insulating material, so that no eddy currents can be induced in their supports.

The rotor is associated with a motor 40 which is of the D.C. type without brushes and iron in the stator and with electronic commutation. A form of construction is shown in FIG. 11. The rotating field structure consists of two iron rings 143 and 144 which are laminated when necessary to reduce eddy current losses. One or two of these rings are fitted with twelve magnets such as 145 having successively opposite magnetic poles. The number of the magnets can be adapted for each particular characteristic of the motor.

The stationary armature comprises eighteen coils 146 of multistrand insulated conductors of a low diameter to avoid eddy currents and which are encapsulated in an epoxy resin with glass fiber mechanical reinforcements. The number of coils can be adapted to the number of magnets and/or the input voltage. Several commutation systems can be used which include:

photodiodes/phototransistors commutation,
Hall effect cells commutation; or
electromagnetic sensors commutation.

The preferred system of the present invention but which does not exclude the possibility of utilizing the others is a photoelectric device. A light source for example a photoelectric emissive diode 29 (see FIG. 1) on the stator part emits a permanent focused flux of light and a windowed sleeve 30 on the rotor crosses the light flux which is detected on a phototransistor 31 on the stator. The light pulses are utilized for triggering the current in the different coils according to the relative position of the magnets in relation to the coils. A double set of light sources associated with photoelectric sensors is utilized for avoiding any uncertainty at any time as to the level of the commutation signals mainly at the beginning and the end of the signals.

The motor 40 is located at one end of the rotor. At the other end of the rotor a generator 41 of the same type as the motor is installed as shown in FIG. 1. The generator delivers an A.C. current which is rectified if necessary. For specific utilizations, the generator can be utilized as a second motor in order to achieve a higher acceleration of the rotor.

In the case where the generator has the same electromagnetic structure as the motor the desired result can be achieved with the same commutation sensors. In the same way, the motor can be utilized as a second generator and these conditions of operation enable the device to deliver the stored energy with a higher output power.

According to the level of energy which has to be stored and to the conditions of operation the system can be operated at a high speed in a vacuum but also at a lower speed with less stored energy. For example, a rotor storing enough energy to deliver 3 kW during 20 minutes of useful power with a main rotation speed of 12,000 RPM can deliver 3 kW during about 1 minute 15 seconds with a maximum 3,000 RPM. Under these conditions, it can be operated in air or in a gas at the atmospheric pressure (helium, for example). The magnets and coils are designed for the chosen conditions of operation.

According to the level of energy which must be stored and the conditions of operation, several configurations may be adopted for the flywheel rotor 10.

The nominal configuration which applies for an equipment delivering 1 kW during 20 minutes or the same energy for a longer time corresponds to an operation in a vacuum. Consequently, the overall electromagnetic system with the subsystems as described previously are in a vacuum enclosure. The same equipment is also used for obtaining a power source eliminating the micro-interruptions of the network and in this case delivery of the same power for one minute is sufficient; the same system may then be operated with only a protective housing and with atmospheric pressure inside the housing.

In the case where vacuum is necessary, several configurations are possible for maintaining the vacuum inside after it is established therein. The first realization consists of closing the vacuum enclosure by any type of welding (electronic beam welding, tin welding, etc . . . ). A solution which allows the disassembling of the vacuum enclosure for any intervention with the equipment appears in part in FIG. 12. The cover 151 of the vacuum enclosure 150 is equipped with two sealing circular rings 152,153. The air volume 154 between these rings is evacuated and then filled with an oil which has a low vapor pressure. A variant of this concept utilizes a resin with a polymerization catalyst such as epoxy resin which also has a low vapor pressure. In such a case in order to allow the disassembling of the vacuum enclosure the surfaces thereof are treated with a product avoiding strong adherence of the resin to the enclosure. The electric connections through the enclosure walls are realized by sealing connectors such as of glass welded onto a sealed through-conductor in its center and to the vacuum enclosure on its periphery.

A practical realization of the device of the present invention contains a steel rotor of 370 kg rotating at 12,000 RPM. Experience has demonstrated the possibility of storing in such a practical realization 1 kW/h of useful energy which can be delivered in 20 minutes with a power of 3 kW or in a longer time with a smaller power or a smaller time with a larger power of up to 10 kW for the form of embodiment considered.

Obviously, the same model can be utilized for storing a smaller amount of energy while still remaining within the scope of the invention. Larger and smaller models can be designed on the same concepts and remain within the scope of the invention. All the modifications which can be introduced by the activity of a man skilled in the art remain within the scope of the invention, such as for example utilization of a simple motor generator or a different number of centering rings, a different number of magnets or coils for the motor and so on.

The adaptation of a composite rotor remains within the scope of the invention and will allow an increase in the amount of stored energy. Such a rotor can be advantageously of the type described in U.S.c.i.p. application Ser. No. 299,259 filed Jan. 28, 1981, U.S. Pat. No. 4,263,819 issued on Apr. 28, 1981, U.S. patent application Ser. No. 153,397 filed on May 27, 1980 and U.S. patent application Ser. No. 367,124 filed on Apr. 9, 1982.

Combinations of all the configurations discussed above may be used in the present invention.

Figure 13:
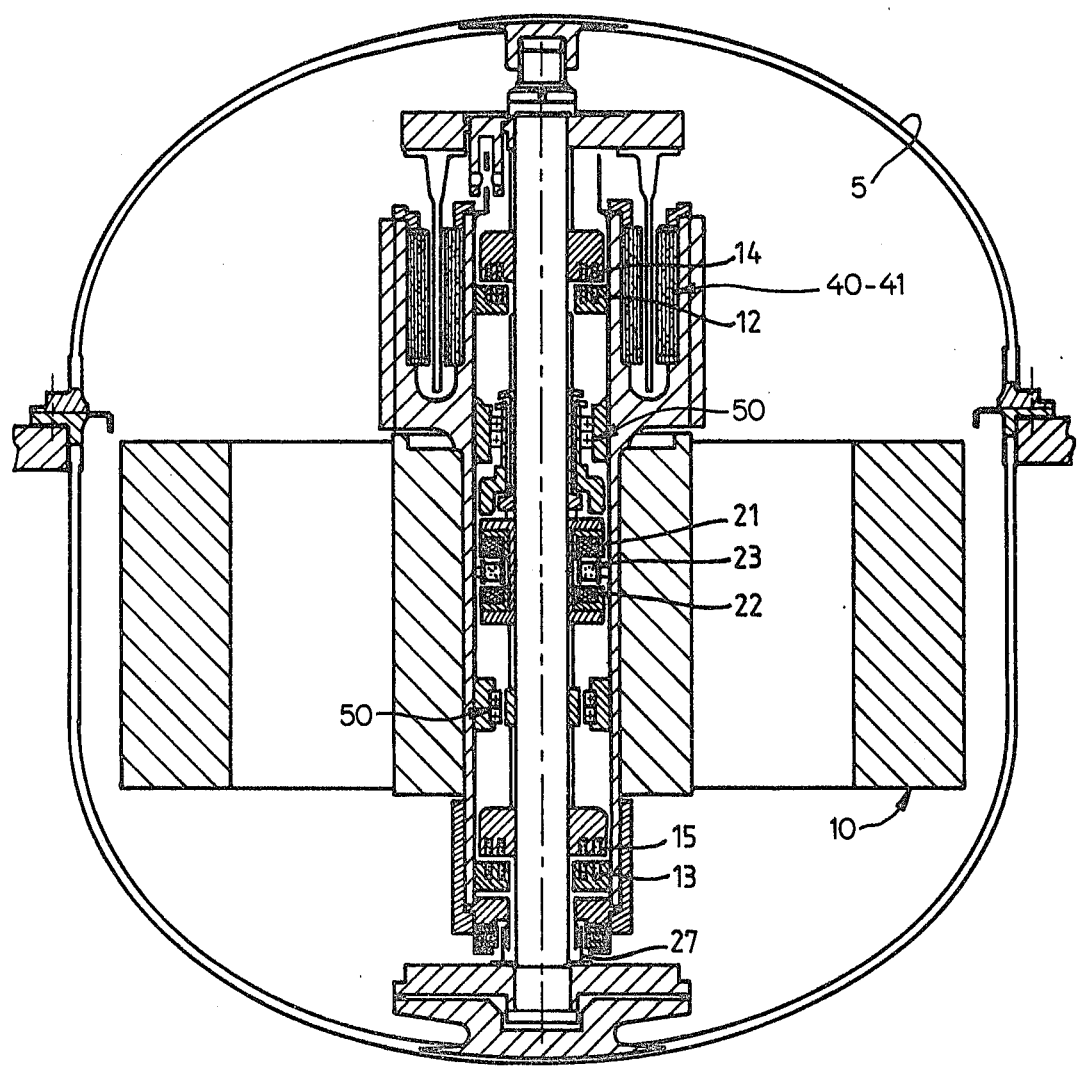
FIG. 13 is an overall view of a variant of construction of the present invention shown in FIG. 1.

A possible configuration is presented by FIG. 13 in which the motor 40 is also the generator 41, with the constitutive elements being similar in most respects to the forms of embodiment of FIG. 1.

Other considerations of structure according to the dimensions of the rotor can exist; the rotor can be disposed between the upper and lower magnetic bearings or it can be outside under the lower bearing. In a similar manner the motor can be either under the lower bearing or over the upper bearing. When a steel rotor is utilized the speed and consequently the energy can be increased by a winding of a high tensile strength, low density, composite material wound or prestressed on the rotor such as with the use of glass fibers, carbon fibers or polymer fibers, which may be embedded in resin.

Figure 14:
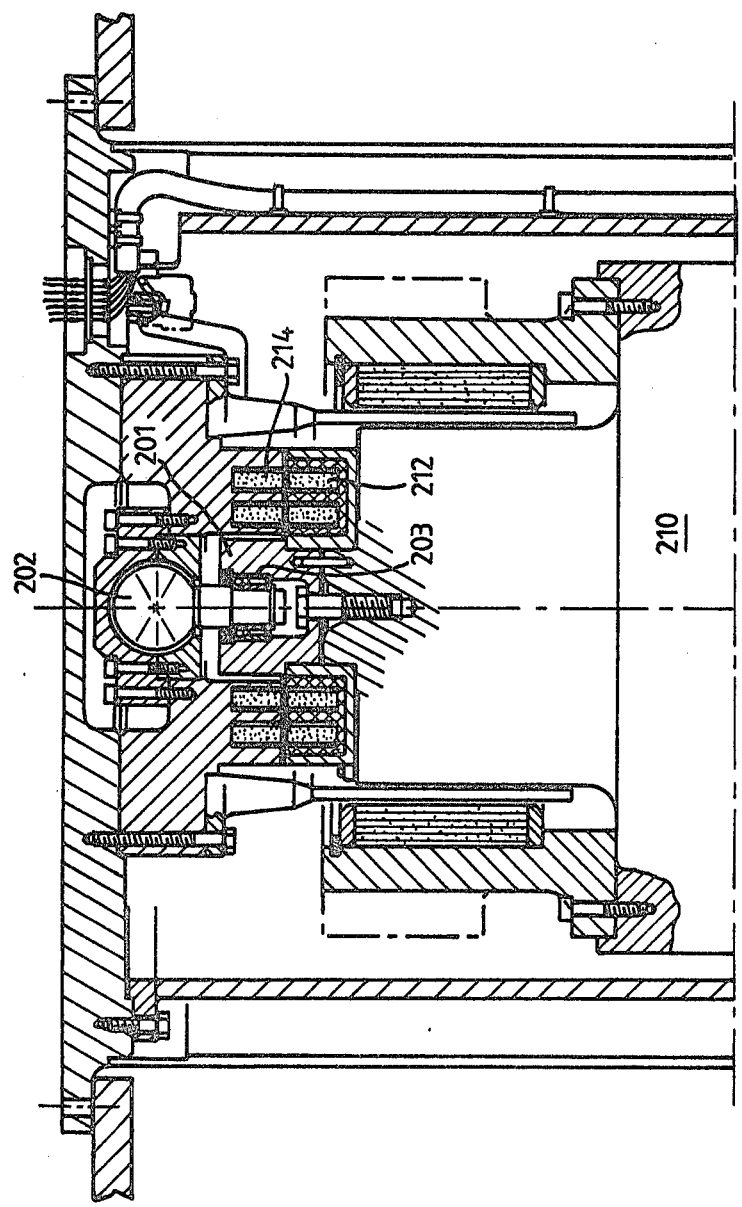
FIGS. 14 and 14A complementary for clarification of the drawing represent a sectional view of a variant of overall configuration in which the rotor is full and the shaft associated with this rotor is rotatable.
Figure 14A:
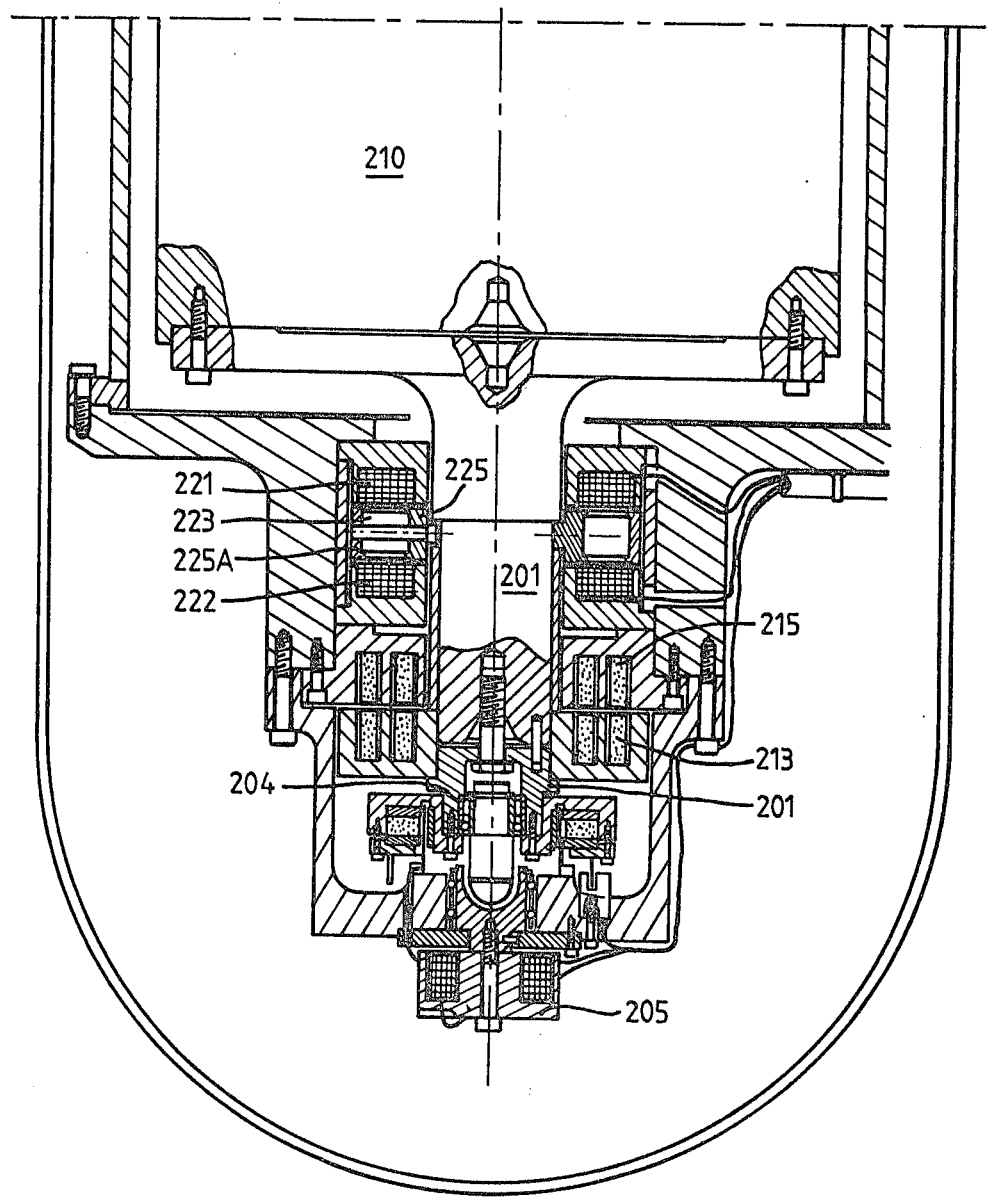

The overall configuration may be the object of a variation according to FIGS. 14 and 14A. Instead of the rotor being bored in its center to leave a passage therethrough for a fixed shaft axially securing the upper and lower parts of the stator, the rotor 210 may be solid in its central part. The shaft 201 associated with the rotor is then rotatable and carries at its upper portion a knuckle joint 202 mounted on ball bearings 203. When the equipment is not in operation, i.e. when the axial magnetic suspension is not supplied with current, the mechanical contact between the fixed portion and the rotating portion is effected on a level with knuckle joint 202.

The magnetic centering rings 212,213 of the rotor are fixed to the rotary, rotor 210-shaft 201 assembly and the magnetic rings 214, 215 are fixed to the stator. There is also provided a double electromagnet 221 and 222 which is then fixed to the stator having its magnetic circuit biased by the permanent magnetic ring 223 in the mobile armature 225,225A which is then fixed to the rotary shaft 201.

A complementary device is mounted on the lower part. It enables the rotor to rotate between two ball bearings i.e. the upper one 203 associated with the knuckle joint and a lower one 204, with the mechanical play on the level thereof being cancelled by the action of an electromagnet 205.

Such a device enables the rotor to be held centered in the case of seismic activity. Moreover, it permits avoiding any motions of the rotor with respect to the stator during transportation.

In other terms, when the shaft is fixed the rotor is bored through and when the shaft is rotatable it rotates with the rotor which then can be solid, with the extensions of the rotating shaft outside the rotor being possibly taken advantage of for cooperation with any associated magnetic or electromagnetic device.

However, in order not to excessively extend the rotor assembly the radial damping devices are realized differently (FIG. 15) as compared to the form of embodiment already described.

A magnetic circuit biased by a magnet A closes through two gaps $E_1, E_2$ on the steel rotor 210. When the rotor is driven into a radial excursion motion, for example when passing a critical frequency the gaps $E_1, E_2$ vary and the magnetic field variation produces an electromotive force in the coils $B_1, B_2$. Such an electromotive force is applied to the input of an amplifier which sends a current proportional to the electromotive force to a magnetic circuit D. Thus, it is possible to create simply a force opposed to the radial excursion rate of the rotor. According to the characteristics of this rotor there can be a system of this type substantially in the middle of the height of the rotor, on a level with the center of gravity or one such a system at each end.

The sensing of the radial speed can be effected by any other system, for example, capacitive sensor or eddy current sensor, etc.

It will be understood that this invention was only described and represented in a preferential form of embodiment and that equivalent parts can be substituted for its constitutive elements according to the sectors of activity without going out from the scope of the invention as defined in the appended claims.

Thus, the invention relates in particular not only to the equipment which has been described and represented but also to the method permitting to obtain an auxiliary uninterrupted electric power sources by operating the equipment.

What is claimed is:

1. An equipment for storing energy under kinetic form and uninterrupted recovery of this energy in electric form in a gravity field, of the type comprising an enclosure, a stator within said enclosure, a flywheel rotor adapted to be magnetically suspended relative to said stator and disposed within said enclosure, touch-down bearings between said stator and said rotor to support said rotor when the latter is not suspended magnetically, and means for magnetically suspending said rotor relative to said stator and maintaining said rotor in equilibrium relative to said stator, including permanent magnet rings on said stator opposite an equivalent number of permanent rings on said rotor for creating a lifting force on said stator, a double electromagnet comprising a permanent magnet ring having electromagnet coils on each side of said last magnet ring with said ring being mounted on said rotor and with said electromagnet coils being mounted on said stator, axial rate sensor means to detect the axial rate of the rotation of said rotor and comprising coils fixed to said stator adjacent a magnet attached to said rotor, servo-loop means for maintaining applied forces including the weight of said rotor compensated with lifting forces of said opposing permanent magnet rings, by connecting said electromagnet coils in feedback relationship with said rate sensor coils, a lift-off logic in said servoloop means to control the sense of initial current of said servoloop means when said rotor is supported by said touch-down bearings and no axial rate is detected by said rate sensor, damping means to prevent excessive radial excursion and comprising opposing permanent magnets and a centering member passing between them and a motor and a generator having at least one armature mounted for rotation with said rotor.

2. An equipment as claimed in claim 1, wherein a fixed shaft is part of said stator, said rotor being bored through, and mounted around the shaft, said permanent magnet rings, double electromagnet and damping means being disposed in the bore between said fixed shaft and said rotor.

3. An equipment as claimed in claim 1, wherein a rotating shaft is mounted with and rotates with the rotor, extensions of said rotating shaft outside said rotor being used for receiving rotating parts of said permanent magnet rings and double electromagnet having fixed elements connected to said stator.

4. An equipment as claimed in claim 3, wherein an upper extension of said rotating shaft carries a knuckle joint mounted on ball bearings and which in the absence of an axial suspension provides for the mechanical contact with a fixed part of the equipment.

5. An equipment as claimed in claims 3 or 4, wherein another ball bearing is provided on a lower extension of said rotating shaft, the mechanical play on this level being cancelled by the action of an electromagnet under certain conditions of operation.

6. An equipment as claimed in claim 3 or 4, wherein several radial damping devices are provided on any point on the generatrix of said rotor, and comprises a biased magnetic circuit closing through two circumferential gaps on said rotor, any variation of said gaps resulting in a magnetic field variation producing an electromotive force in said electromagnet coils which in its turn produces after amplification a current in a corrective magnetic circuit in said devices.

7. An equipment as claimed in any of claims 1, 2 or 3, wherein said permanent magnet rings on said stator disposed opposite an equivalent number of said permanent magnet rings on said rotor are such that said magnet rings of said stator are placed radially adjacent one another and said magnet rings of said rotor are placed radially adjacent one another concentrically with respect to one another.

8. An equipment as claimed in claim 7, wherein said magnet rings of said rotor are mounted with vertically opposing rings of said stator in a magnetic relationship of mutual attraction.

9. An equipment as claimed in claim 1, wherein said lift-off logic produces reversal of current in said electromagnet coils when the current therein reaches a predetermined level.

10. An equipment as claimed in claim 1, characterized in that said lift-off logic produces reversal of current in said electromagnetic coils when the current therein has increased for a predetermined time period without said rotor being magnetically suspended and lifted off said touch down bearings.

11. An equipment as claimed in claims 1, 2, 3, or 4, characterized in that said permanent magnet rings of said stator opposite to an equivalent number of said permanent magnet rings of said rotor are such that said magnet rings are magnetized in the same direction as the axis of said rotor, polar pieces connecting the ends of pairs of said magnet rings opposite the ends forming gaps with opposing ones of said magnet rings positioned vertically.

12. An equipment as claimed in claims 1, 2, 3, or 4, characterized in that said axial rate sensor comprises coils fixed to said stator, said coils comprising two coils connected to add the electromotive forces induced therein.

13. An equipment as claimed in claim 11, characterized in that said axial rate sensor comprises an axial magnetization magnet ring attached to said rotor and associated to polar pieces closing the magnetic flux on either side of coils connected to said stator and located in the gap constituted between said polar pieces.

14. An equipment as claimed in claims 1, 2, 3, or 4, characterized in that said motor and said generator are incorporated in a single unit having only one armature and one inductor.

15. An equipment as claimed in any of claims 1, 2, 3, or 4, characterized in that said motor and said generator comprise a motor at an axial end of said rotor and said stator, and a generator at the other axial end of said rotor and said stator.

16. An equipment as claimed in claims 1, 2, 3, or 4, characterized in that said motor and said generator comprise a separate motor and a separate generator connected to act as two motors for increased power of rotation of said rotor and as two generators to obtain increased power and increased time period of power output.

17. An equipment as claimed in claims 1, 2, 3, oe 4, characterized in that said enclosure is hermetically sealed and extends advantageously below the ground surface.

18. An equipment as claimed in claims 1, 2, 3, or 4, characterized in that said enclosure is hermetically sealed and comprises at least two parts constituting said enclosure, a pair of spaced sealing rings between said parts of said enclosure, a material having a low vapor pressure filling the space between said sealing rings.

19. An equipment as claimed in claim 18, characterized in that said material having a low vapor pressure is an oil.

20. An equipment as claimed in claim 18, characterized in that said material having a low vapor pressure is a resin.

21. An equipment as claimed in claim 20, characterized in that surfaces of said enclosure adjacent to said material having a low vapor pressure are treated with material to avoid too strong adherence of said resin to said surfaces to allow disassembly of said enclosure.

22. An equipment as claimed in claims 1, 2, 3, or 4, wherein said centering member of said damping device comprises a plurality of short-circuited coils passing between said opposing permanent magnets of said damping device.

23. An equipment as claimed in claim 22, wherein said plurality of coils form coil pairs due to the even number thereof and in that an amplifier connects one of said coils in each pair to the other of said coils.

24. An equipment as claimed in claim 23, wherein said amplifier of said damping system is operated for predetermined time periods.

25. An equipment as claimed in claims 1, 2, or 3, wherein a radial rate sensor to detect the radial rate of excursion of said rotor comprises coils mounted adjacent a magnet fixed to said rotor and in that damping means to prevent excessive radial excursion rate of rotation comprises an armature of ferromagnetic alloy fixed to said stator, a coil fixed to said armature and a permanent magnet ring having polar pieces at its ends and affixed to said rotor.

26. A method of storing energy under kinetic form and uninterrupted restoration of said energy in electric form, in a field of gravity characterized by comprising the steps of starting a steel rotor in rotation into a magnetically suspended unstable equilibrium by a lift-off logical determination from supporting bearings, said equilibrium being defined by compensation of weight with opposite magnetic permanent forces, building a source of uninterrupted power by increasing rotation of said rotor up to a predetermined maximum speed, switching from an electric power input to an electric power output upon loss of power input by obtaining the power output from kinetic energy in the rotor, and continuing rotation in magnetically suspended equilibrium from stored kinetic energy in the rotor.

27. A method as claimed in claim 26, characterized in that the lift-off logic conditions comprise a determination by measurement of the maximum current.

28. A method as claimed in claim 26, characterized in that the lift-off logical determination comprises measurement of a predetermined time period.

29. A method as claimed in claim 26, characterized in that the rotation of the steel rotor flywheel takes place in an enclosure from which air has been evacuated.

30. A method as claimed in claim 29, characterized in that said enclosure in which said steel rotor flywheel is placed is sunk below the surface of the ground.

31. A method as claimed in claim 26, characterized by providing a composite rotor permitting increase of the stored energy.

* * * * *